Oct. 30, 1934.　　　　E. W. MILLER　　　　1,978,845

WHEEL TRUING MACHINE

Filed Sept. 26, 1932　　2 Sheets-Sheet 1

Inventor
Edward W. Miller

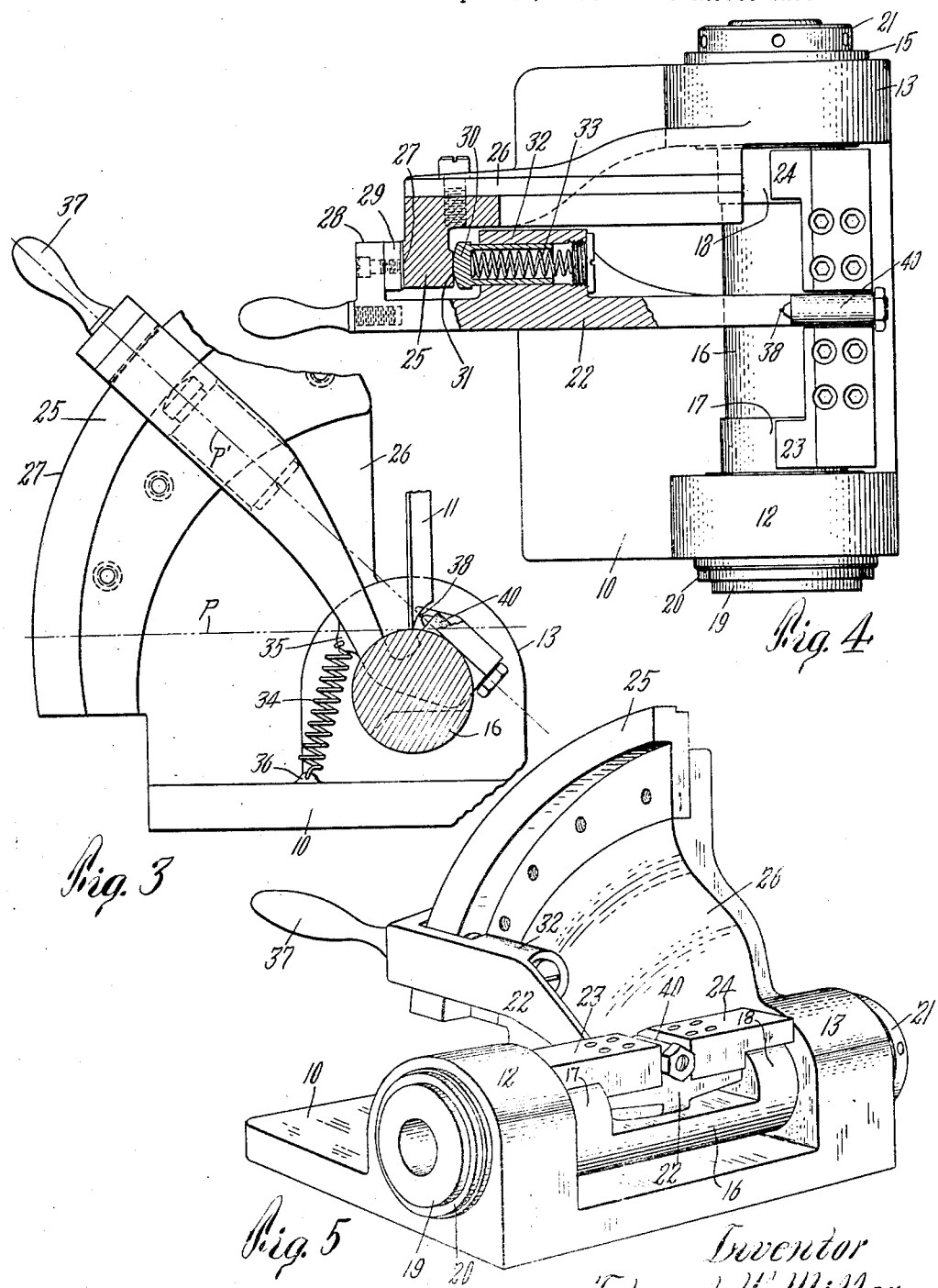

Patented Oct. 30, 1934

1,978,845

UNITED STATES PATENT OFFICE 1,978,845

WHEEL TRUING MACHINE

Edward W. Miller, Springfield, Vt., assignor to The Fellows Gear Shaper Company, Springfield, Vt., a corporation of Vermont Application September 26, 1932, Serial No. 634,820

8 Claims. (Cl. 125—11)

The present invention relates to means for truing grinding wheels and analogous cutting or smoothing tools. Its object is to furnish a simple and highly accurate means for shaping the active face or elements of such wheel to a prescribed curve, thereby adapting it for form finishing a work piece or for generating a prescribed conjugate curve in a work piece. More particularly the object is to enable grinding wheels to be trued with a zone having a curvature in profile which may be either exactly complemental to the face of a prescribed gear tooth, or may correspond to the profile of an internal gear tooth suited for generating spur or helical gear teeth according to a method which I have invented. While I have mentioned specifically herein a grinding wheel as the tool to be thus trued, I wish to make it clear that the principles of the truing means here shown are applicable also to truing specifically different articles, such as toothed cutters, disks for use as lapping or burnishing tools, scraping tools, etc.

The embodiment of the invention chosen for illustration herein is designed to generate an involute curve radially of the wheel to be trued, by means of a diamond; but the broader aspects of the invention are not limited to the specific details of this illustration.

Referring to the drawings,—

Fig. 3 is a view generally similar to Fig. 1 but showing the movable parts in a different position;

Fig. 4 is a plan view, partly in section, of the machine taken on line 4—4 of Fig. 1;

Fig. 5 is a perspective view of the machine.

Figure 1:
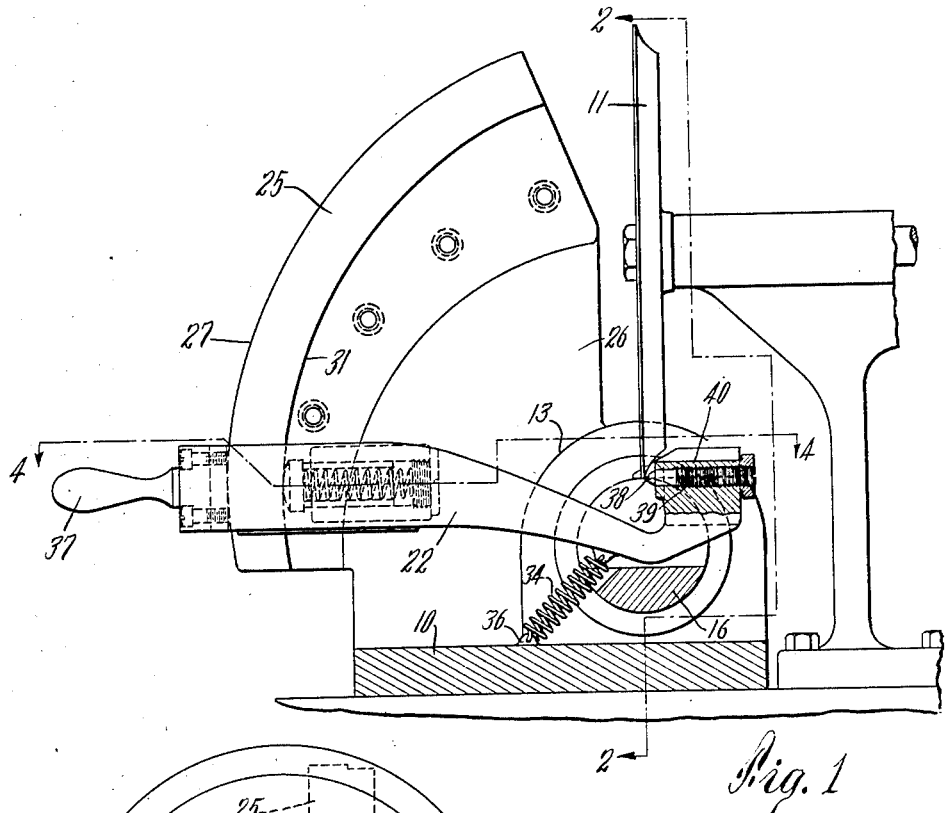
Fig. 1 is a central vertical section of the truing machine embodying this invention in position for truing a grinding wheel.
Figure 2:
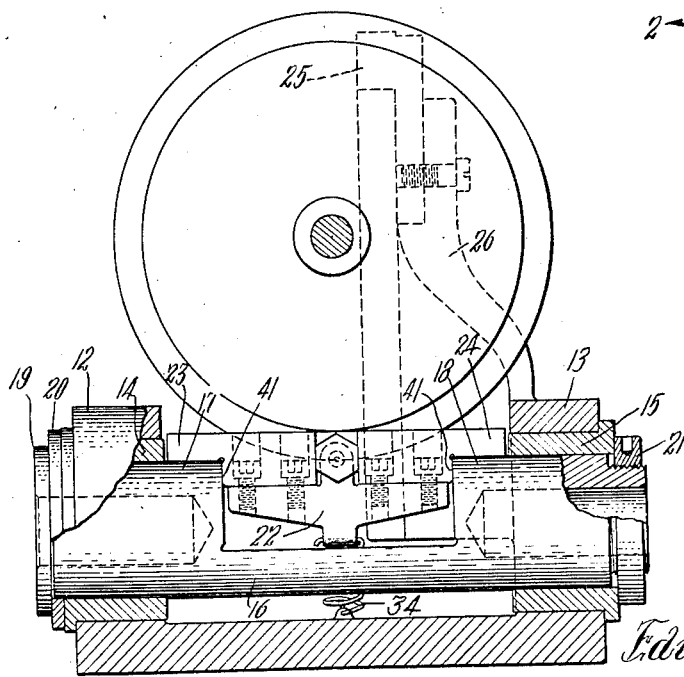
Fig. 2 is a vertical section taken on line 2—2 of Fig. 1.

As here represented the machine comprises a base 10 of such massive character that when placed on the table of a fixture or machine which rotatably supports a grinding wheel 11, it will stay without liability of being displaced by manipulation of the parts which are movable in truing a wheel. It may of course be bolted or clamped in place; or it may be a permanent part of a wheel truing fixture which is additionally equipped with shaft bearings, a shaft to which a grinding wheel removed from another machine may be made fast, and means for driving such shaft at suitable speed.

The base 10 is equipped with separated bearing sleeves 12, 13, and bushings 14, 15 therein, in which are mounted the opposite ends of a bar 16 having cylindrical surfaces 17 and 18 which serve conjointly as the base cylinder or circle for the rolling movement of the truing tool later described. Such bar is preferably made as a cylinder, cut away at one side in its middle part to accommodate the rocking member and having a head 19 at one end which is drawn up against the end of bushing 14 and an interposed washer 20, by a nut 21 screwed on the other end which abuts on the end of bushing 15.

A rocking member 22 carries rocker extensions 23 and 24 which overlap and rest on the cylindrical arcs 17 and 18 respectively. When the purpose is to form an involute curve, as is the case here, the contacting under faces of these extensions are plane surfaces. It is to be understood that such faces of both extensions are in the same plane and that the arcs 17 and 18 are co-axial and have the same radius.

A guide rib 25, which I call for convenience a former, is secured to a web 26, rigid with the base, and has a guiding surface 27 which is an involute of a base circle coinciding with the cylindrical arcs 17 and 18 or a projection of such arcs. The rocking member 22 extends across such rib and has an abutment 28 overlapping the face 27 and carrying a hardened wear piece 29 which is maintained in sliding contact with the face 27 by a spring pressed pin 30 bearing on the inner surface 31 of the rib. The pin 30 slides in a socket 32 on the side of the rocker, and its spring 33 is sufficiently powerful to insure firm contact of slide 29 against surface 27 and to overcome the outward component of force exerted by spring 34. The latter spring is provided to hold the rocker faces down on the base cylinder and exerts tension between anchorage points 35 and 36 on the rocking member and base 10 respectively. A manipulating handle 37 is secured to some part of the rocking member, preferably its outer end. It will now be apparent that when the member 22 is shifted along the rib 25, it is so guided by the involute curved face 27 as to cause rocking or rolling of the extensions 23 and 24 over the base cylinder arcs without slip. Hence any point in the same plane with the contact faces of the parts 23 and 24 describes an involute curve in space. Thus a truing tool, as 38, suitably located in this plane to engage the face of a grinding wheel or the like will cut an involute path in such face.

The truing tool here shown is a diamond of the character commonly used for truing emery wheels, secured centrally in one end of a screw threaded holder 39 which is adjustably screwed into a socket 40 of the rocking member and so disposed that its axis coincides with the plane above described, and that the point of the diamond may be brought by adjustment so as to coincide with the point of intersection between the base cylinder and the radius of the grinding wheel which is perpendicular to the axis of such cylinder, when the rocking plane is perpendicular to said radius. Thus the curve cut in the grinding wheel may be carried all the way to the base circle, and the wheel formed to act at one time on the entire involute face from root to tip of a gear being ground or finished.

For better illustration, Fig. 3 shows by broken lines the projection of the rocking plane, in two of its positions, designated P and P' respectively. P' is the location of the plane when the rocking member is in the extreme position shown in Fig. 1.

Touching on the structural details shown here, the rocker extensions 23 and 24 are made as separate pieces bolted to the rocking member and having end thrust faces 41 bearing on the perpendicular end faces of the cut out in the bar, to confine the truing tool in a definite path. The rib 25 is substantially in a zone perpendicular to the axis of the cylinder. This rib may be of equal radial thickness, i. e., its inner surface 31 may be similar to the involute outer face; but this is not important since the only limiting factors are that the rib be amply thick for strength at all points and that its variation in thickness be not great enough to affect seriously the functioning of the spring pressed pin. It will be readily appreciated that the guiding face of the former need not be the outer face inevitably; and that the inner face instead may equally well be the guiding face provided it is a true involute of the base circle and that the unyielding abutment of the rocking member (corresponding to the wear piece 29) and the yielding follower, (corresponding to the spring pressed pin 30), are correspondingly reversed. However arranged, the fact that the surface of the former is an outer convolution of the involute, or at least is a part far removed from the base circle, insures great accuracy in guiding the truing point at and close to the base circle, owing to the greatly multiplied arc at the guiding surface subtended by the same angle of rolling motion.

Persons skilled in the art will readily appreciate that by appropriate changes in the relationship between the truing tool and the grinding wheel, the wheel may be properly formed to correspond with helical gears and other variations from involute spur gears. Also that by appropriately changing the outline of the former, or of the base cylinder arcs 17 and 18, or the contour of the rolling surfaces of the rocker member, or any two or all of them, a wide variety of curves may be generated by the truing tool. For instance, it is feasible, and in some cases desirable, to make the arcs 17 and 18 of longer or shorter radius than the theoretical base cylinder of a given involute, through a short part of the distance over which the rocking member rocks. The curve then traced by the truing tool would then not harmonize perfectly with the involute development from the theoretical base cylinder, but would be effective in modifying the shape of the wheel. Thus while the invention is primarily and specifically a simple and inexpensive, but exceedingly accurate, means for tracing an involute curve, its principles are applicable to the use of tracing other curves; and the protection which I claim is of corresponding scope.

In this description and the following claims, the term "wheel", unless qualified by express words to mean a grinding wheel, is intended to include within its scope any of the disks or disk like implements hereinbefore referred to as equivalent to grinding wheels for the purpose of the invention. Indeed, my claimed protection is intended to cover all uses of which the machine is capable, and the use with the machine of other truing or scribing tools than a diamond.

What I claim is:

1. A machine for describing involute curves comprising a relatively stationary member having a cylindrical base surface, a guide or former having a guiding face which is an outer convolution of an involute of a base circle coaxial and of equal radius with said cylindrical surface, a rocking member having a plane rolling surface in tangent contact with said base cylinder and having also an abutment in contact with said guiding surface, and a truing tool carried by the rocking member located in the said rolling plane at a point such that it traces an inner convolution of the same involute with rocking movement of said member.

2. A wheel truing machine comprising a relatively stationary base cylinder, a guide or former having a guiding surface which is an arc, remote from the base circle, of an involute curve whereof the base circle is coaxial and of equal radius with said base cylinder, a rocking member having a plane rolling surface in tangent contact with said base cylinder and an abutment in contact with said involute guiding surface, and a truing tool carried by the rocking member located in the rolling plane at a point nearer to the base cylinder than said involute guiding surface.

3. A wheel truing machine comprising a base or holder, a bar secured to said holder having a recess in one side and coaxial cylindrical base surfaces of equal radius at opposite sides of said recess, a rocking member having a part located in said recess and rocking extensions projecting from either side overlapping said cylindrical surfaces and provided with plane rolling surfaces, both in the same plane and in contact each with the respectively adjacent base cylinder, a guide or former remote from said base cylinder and having a guiding face which is an arc of a curve involute to a base circle of the same radius and coaxial with the base cylinders, an abutment on the rocking member engaging said guiding surface, yielding means maintaining said abutment in contact with the guiding surface, and a truing tool carried by the rocking member in the rolling plane at a point which is brought into coincidence with the projection of the base cylinders in the course of the rocking movement of the rocking member between the limits of such movement.

4. The combination with a rotatably mounted grinding wheel, of a tool for truing a concave involute zone in such grinding wheel adjacent to the circumference thereof, comprising a base cylinder, means for holding said cylinder stationary with its axis perpendicular to a radius of the grinding wheel and in a plane perpendicular to the axis of such wheel, a rocking member having a plane rolling surface in tangent contact with said base cylinder, a guide or former having a guiding surface which is an involute of the same base cylinder and is an arc of the involute remote from the base cylinder, said rocking member having an abutment in contact with the rocking member, and a truing tool carried by the rocking member in said rolling plane and in a position such that it is brought tangent with the base cylinder, or with the axial projection thereof when said rolling plane is parallel to the axis of the grinding wheel.

5. The combination with a rotatable shaft adapted to hold and rotate a grinding wheel, of a relatively stationary base cylinder arranged with its axis perpendicular to a line which is also perpendicular to the axis of said shaft, a stationary guide or former having a guiding surface which is a remote arc of an involute curve of the said base cylinder, a rocking member having a guiding abutment engaging said guiding surface, and a plane rolling surface in tangent contact with the base cylinder at the side of the latter toward the shaft, a truing tool mounted on the rocking member in said rolling plane and so located that its cutting point may be brought to the point of intersection of the before named perpendicular line with the base cylinder in the course of the rocking movement of said member.

6. A curve generating machine comprising a base, two identical curved base surfaces mounted on said base in separated alinement with one another, a rocking member having extensions overlapping said curved surfaces and provided with rolling faces in alinement with each other and in tangent contact with the base surfaces, a scribing point carried by the rocking member between said extensions so located that it lies in the line of tangency between the rocking faces and base surfaces when the rocking member is in one extreme position, and a guide or former remote from the base surfaces and having a guiding face, an abutment on the rocking member engaging said guiding face so as to travel in contact therewith when the rocking member is rocked; said rocking member being constructed with an offset between the scribing point and abutment providing a space adequate to receive the rim portion of a grinding wheel being trued by the scribing point throughout the range of movement of the rocking member.

7. A wheel truing machine comprising a base, a bar mounted in said base having a recessed intermediate part and convex end parts, the respective surface elements of which are in longitudinal alinement with one another, a rocking member having extensions overlapping the end parts of said bar, and an intermediate part occupying the recess in the intermediate part of the bar, said extensions being provided with rocking faces in tangent contact with the convex parts of the bar, a guide or former at one side of said bar having a guiding face which is a segment of a curve enveloping the bar, and a scribing point carried by the rocking member intermediate said extensions.

8. A machine for describing curves comprising a member having a curved base surface, a rocking member having a rolling surface in tangent contact with said base surface, a guide engaging said rocking member at a distance from said base surface and having a surface which corresponds to a curve traced by a point on said rocking member when the latter is rocked with its rolling surface in nonslipping tangency with said base surface, and a scribing point carried by the rocking member in a location such that it lies between said guide and the tangent point of the rolling surface and base member in all parts of its path removed from the base surface.

EDWARD W. MILLER.